United States Patent
Dewa et al.

[11] Patent Number: 5,923,425
[45] Date of Patent: Jul. 13, 1999

[54] GRAZING INCIDENCE INTERFEROMETRY FOR MEASURING TRANSPARENT PLANE-PARALLEL PLATES

[75] Inventors: Paul G. Dewa, Newark; Andrew W. Kulawiec, Fairport, both of N.Y.

[73] Assignee: Tropel Corporation, Fairport, N.Y.

[21] Appl. No.: 08/975,145

[22] Filed: Nov. 20, 1997

[51] Int. Cl.⁶ .................................................. G01B 9/02
[52] U.S. Cl. ........................ 356/353; 356/357; 356/359
[58] Field of Search ...................... 356/353, 355, 356/357, 359, 360, 351

[56] References Cited

U.S. PATENT DOCUMENTS

| | | | |
|---|---|---|---|
| 4,072,423 | 2/1978 | Kimura et al. | 356/357 |
| 4,221,486 | 9/1980 | Jaerisch et al. | |
| 4,325,637 | 4/1982 | Moore | 356/359 |
| 4,859,061 | 8/1989 | Inoue | 356/359 |
| 5,327,219 | 7/1994 | Steimle et al. | |
| 5,488,477 | 1/1996 | de Groot | |
| 5,568,256 | 10/1996 | Korner et al. | 356/359 |

OTHER PUBLICATIONS

"Measurement of the Inhomogeneity of a Window" by Chiayu Ai and James C. Wyant, Optical Engineering, Sep. 1991, vol. 30 No. 9, pp. 1399–1404.

"Twyman–Green Interferometer For Testing Microspheres" by Johannes Schwider and Oliver Falkenstorfer, Optical Engineering, Oct. 1995, vol. 34, No. 10, pp. 2972–2975.

*Primary Examiner*—Samuel A. Turner
*Attorney, Agent, or Firm*—Eugene Stephens & Associates

[57] ABSTRACT

A grazing incidence interferometer includes an extended light source for limiting spatial coherence of reference and test beams. A test plate is oriented at a grazing incidence to the test beam so that a first portion of the test beam is reflected from the front surface of the test plate, a second portion of the test beam is reflected from the back surface of the test plate, and the two test beam portions are sheared with respect to each other. The spatial coherence of the test beam is related to the lateral shear between the first and second test beam portions to significantly reduce contrast of an interference fringe pattern between the front and back surfaces of the test plate. Also, the reference beam is realigned with just one of the two test beam portions to favor the formation of an interference pattern between the reference surface and one of the front and back surfaces of the test plate over the formation of an interference pattern between the reference surface and the other of the front and back surfaces of the test plate.

30 Claims, 4 Drawing Sheets

GRAZING INCIDENCE INTERFEROMETRY FOR MEASURING TRANSPARENT PLANE-PARALLEL PLATES

TECHNICAL FIELD

Within the field of optical testing, the invention use of grazing incidence interferometry for measuring characteristics of plane-parallel plates such as surface topology, thickness, and homogeneity. Problems implementing this technology are addressed relating to subjects such as the isolation of interference fringe patterns and correction of image aspect ratios. In this specification, grazing incidence encompasses all off-normal angles of incidence sufficient to produce specular reflection.

BACKGROUND

Planar surface shapes, which can be readily matched by optical wavefronts, are especially suitable for measurement by interferometers. Among these are reflective optical flats and prisms, as well as non-optical elements having flat surfaces. However, the near symmetry of transmissive plane-parallel plates, such as glass plates, presents special challenges and opportunities for interferometric measurement.

The parallel surfaces of such plates reflect light in parallel directions, so the light reflected by the two surfaces is difficult to distinguish. Fizeau interferometers exploit this property by comparing reflections from both surfaces to measure small wedge angles between the surfaces. Twyman-Green interferometers pass light through both plane-parallel surfaces to measure homogeneity of the material supporting them. However, surface topologies are generally measured one surface at a time to avoid confusion between the surfaces.

For example, Newton interferometers, which use a broad band light source, position a reference flat against one surface of a plane-parallel plate at a time to separately measure the surface topologies of the parallel surfaces. Other white light interferometers eliminate unwanted interference fringe patterns from parallel surfaces of transmissive plates by limiting the production of interference fringe patterns to reference and test surfaces located at equal optical path lengths along reference and test arms. Well-matched optics are required between the reference and test arms, which can be prohibitively expensive for measuring large test plates.

Interferometers with temporally coherent light sources generally rely on light-scattering coatings to distinguish the parallel surfaces. The coatings are applied to one of the parallel surfaces to scatter potentially interfering light from the coated surface. However, the coatings take time to apply, can warp or contaminate the plates, and can be difficult to remove.

U.S. Pat. No. 5,448,477 to de Groot discloses a Fizeau interferometer operating with software that mathematically separates the interference contributions of plane-parallel surfaces. However, the measurement of either or both parallel surfaces of a test plate requires a sequence of phase-shift measurements and inversion of the test plate for measuring both surfaces in two opposite orientations.

Commonly assigned U.S. Pat. No. 4,325,637 to Moore uses limited spatial coherence in a grazing incidence interferometer to relatively increase the fringe visibility of an interference pattern generated between a reference surface and one of the plane-parallel surfaces of a test plate with respect to an interference pattern between the same reference surface and the other plane-parallel surface of the test plate. However, the technique sometimes does little to reduce the fringe visibility of yet another interference pattern between the two parallel surfaces of the plate.

SUMMARY OF INVENTION

Our invention in one or more of its embodiments exploits the reflective surface properties of plane-parallel plates to individually measure surface topologies of either or both parallel surfaces of such test parts in a single mounting position. Illumination at grazing incidence laterally shears reflections of a test beam from the two surfaces, and spatial coherence of an extended light source is limited in relation to the lateral shear to prevent the formation of an undesired interference fringe pattern between the two parallel surfaces of the plate. In addition, the invention provides for realigning a reference beam with the portion of the test beam that is reflected from one of the parallel surfaces but not the portion that is reflected from the other surface. The realignment favors the formation of an interference fringe pattern between the reference surface and the one parallel test surface to the exclusion of a similar interference pattern between the same reference surface and the other parallel test surface.

A thickness measurement is possible based on a translation of the reference surface or the test surface between positions that align the reference beam with each of the two relatively sheared portions of the test beam. The amount of such movement required to compensate for the shear introduced into the test beam by the test plate is correlated with the plate's thickness. Homogeneity can be measured by inverting the test plate and measuring the topology of one of the surfaces for a second time.

Our preferred embodiment is configured as a Twyman-Green interferometer with separate reference and test arms. An extended light source is sized to limit the spatial coherence of an otherwise temporally coherent light beam. The sizing is accomplished by adjusting a beam spot size on a rotating diffuser that interrupts the light beam.

A beamsplitter divides the spatial-coherence-limited beam into reference and test beams. A reference reflector at one end of the reference arm returns the reference beam along a substantially parallel path. A beam expander in the test arm enlarges the test beam for illuminating a desired area of the test plate at a grazing angle of incidence. One portion of the incident test beam reflects from a front surface of the test plate, and another portion of the incident test beam travels through the plate and reflects from a back surface of the test plate. The two test beam portions reflect in the same direction but are laterally sheared. The extended light source is sized in relation to the amount of this lateral shear to preclude the formation of an effective interference fringe pattern between the front and back surfaces of the test plate. A mirror returns both test beam portions to the beamsplitter.

Although the light from both test beam portions reaches the beamsplitter, only one of the test beam portions is realigned with the reference beam. A camera records an interference fringe pattern between the reference beam and the realigned portion of the test beam indicative of topographical variations in one of the surfaces of the test plate. Since the relative lateral shear of the other test beam portion exceeds a spatial coherence limit, an effective fringe pattern between the reference surface and the other parallel surface of the test plate is also precluded. Thus, the invention makes possible the generation of a high contrast interference pattern comparing one of the parallel surfaces of the test plate against the reference surface without muddling the pattern with overlapping interference fringes generated between the two parallel surfaces of the test plate or between the other parallel surface and the reference surface.

The reference reflector and test plate or their images are located in positions that are conjugate to an image plane of a camera. The reference reflector is preferably located close to the beamsplitter to reduce possibilities for independent disturbances in the reference arm. The beam expander in the test arm forms an image of the test surface that is relayed to the camera's image plane.

The grazing incidence at which the test beam illuminates the test surfaces provides not only for laterally shearing reflections from the parallel surfaces of the test plate but also provides for increasing the specular reflectivity from the test surfaces enabling the measurement of rougher surfaces and for controlling sensitivity of the interference measurements. However, the grazing incidence also poses some imaging problems. The light reflected from the test plate is returned along parallel but offset paths from the light used to illuminate the test plate. Accordingly, the optical aperture of the test arm must be large enough to convey the entire image of each test surface through each half of the aperture.

Also, because the test surfaces are not at normal incidence to the test beam, the images of the test surfaces formed by the beam expanders are anamorphically distorted. The camera's optical system compensates for the image distortion by incorporating optics that exhibit different image/object distance ratios in perpendicular planes.

The reference reflector is preferably a right angle prism providing parallel paths for forward and backward directions of the reference beam. Alignment of the reference beam with a selected one of the returning test beam portions can be accomplished by translating the prism in a direction perpendicular to the parallel paths of the reference beam. A measure of the amount of the translation between positions that produce maximum fringe contrast for each of the two portions of the test beam can be equated to a thickness measurement of the test plate. The test plate or other components that affect the alignment between the reference and test beams can be similarly moved to separately measure the two parallel surfaces, and a measure of this movement can be mathematically related to the plate thickness. Deviations in the homogeneity of the test plate can be derived from the measurement of both parallel surfaces in one orientation and an additional measurement of either of the parallel surface in an inverted orientation.

DRAWINGS

DETAILED DESCRIPTION

Figure 1:
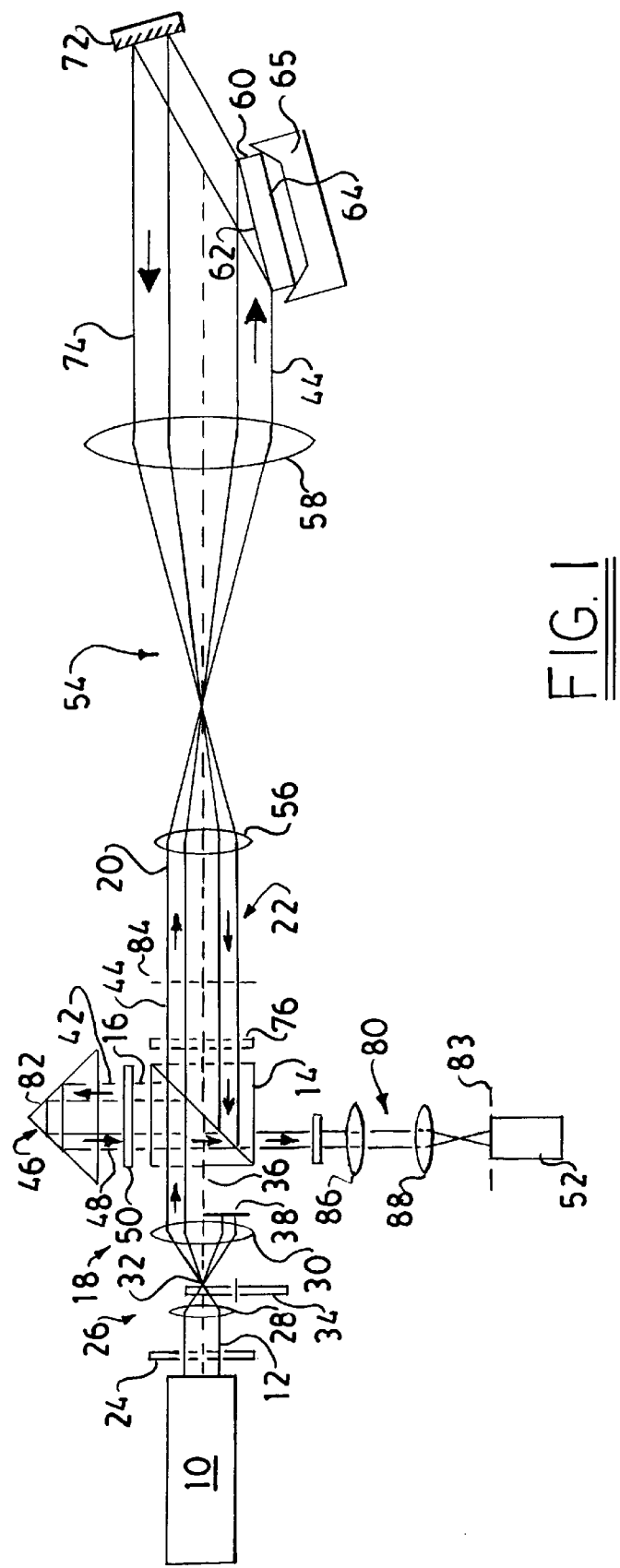
FIG. 1 is a diagram of a Twyman-Green interferometer including an extended light source and a plane-parallel test plate oriented for measurement at grazing incidence.

Referring to the Twyman-Green interferometer of FIG. 1, a coherent light source 10, such as a HeNe laser, produces a primary beam 12 of coherent light. The primary beam 12 is treated in several respects on route to a polarization beamsplitter 14 that divides the primary beam 12 into a reference beam 16 propagating through a reference arm 18 and a test beam 20 propagating through a test arm 22.

A half-wave plate 24, located between the light source 10 and the beamsplitter 14, adjusts the polarization of the primary beam 12 to control the amount of beam energy that is distributed between the reference and test beams 16 and 20. Generally, more energy is distributed to the test beam 20 to compensate for additional losses in the test arm 22. The overall objective of the energy distribution is to optimize ensuing contrast between interfering portions of the reference and test beams 16 and 20.

A beam expander 26, comprising a focusing lens 28 and a collimating lens 30, converges the primary beam 12 through a point focus 32 before recollimating the primary beam 12 at a desired diameter. In the vicinity of the point focus 32, a rotating diffuser plate 34 interrupts the primary beam 12 and randomly scatters light illuminating a spot on the diffuser plate 34. The light scattered from the illuminated spot on the diffuser plate generates an extended light source, whose size is inversely related to the degree of lateral spatial coherence in the affected primary beam 12. Translation of the focusing lens 28 along a reference axis 36 of the beam expander 26 adjusts the size of the illuminated spot on the diffuser plate 34. The collimating lens 30, however, remains at a fixed distance of one focal length from the diffuser plate 34 to recollimate the primary beam 12.

A partial aperture stop 38 blocks approximately one-half of the beamsplitter aperture to distinguish separate pathways for forward and backward directions of light travel within the reference and test arms 18 and 22. For example, a portion of the primary beam 12 is reflected as the reference beam 16 along a forward pathway 42 of the reference arm 18, and another portion of the primary beam 12 is transmitted as the test beam 20 along a forward pathway 44 of the test arm 22. Instead of using the partial aperture stop 38, the beam expander 26 could be sized and positioned to fill a similarly limited portion of the beamsplitter aperture.

An adjustable right angle prism 46 in the reference arm 18 reflects the reference beam 16 along a parallel returning pathway 48 back to the beamsplitter 14. A quarter wave plate 50 interrupts the reference beam 16 along both the forward and backward pathways 42 and 48 to change the polarization of the returning reference beam 16 for favoring transmission through the beamsplitter 14 on route to a video camera 52.

A beam expander 54 in the test arm 22 includes a focusing lens 56 in combination with a collimating lens 58, which together invert and enlarge the forward pathway 44 on route to a test plate 60. The collimating lens 58 is sized and positioned so the enlarged test beam 20 conveyed along the forward pathway 44 illuminates front and back surfaces 62 and 64 of the test plate 60. An adjustable mounting support 65 orients the two surfaces 62 and 64 of the test plate 60 at grazing incidence to the test beam 20.

Figure 2:
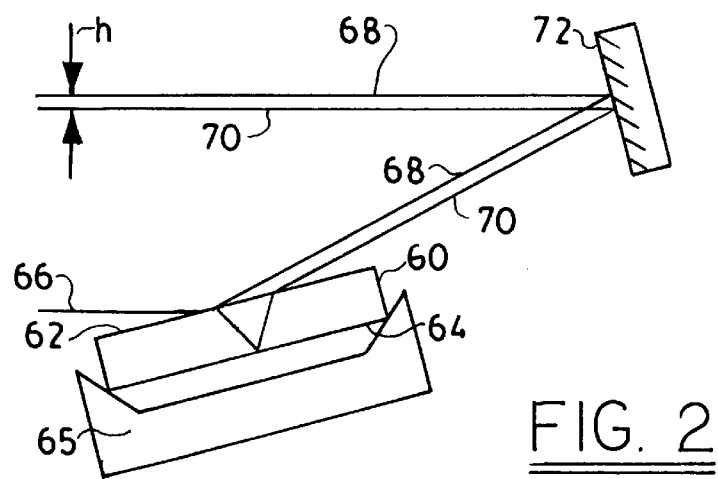
FIG. 2 is an enlarged partial view of the interferometer in the vicinity of a test plate and a return optic illustrating a lateral shear that results from the grazing incidence.

The partial view of FIG. 2 shows a central ray 66 of the test beam 20 laterally sheared into two different rays 68 and 70 by respective reflections from the front and back surfaces 62 and 64 of the test plate 60. The extended light source is sized so that the lateral shear "h" between the rays 68 and 70 is beyond a spatial coherence limit for forming an effective fringe pattern between the front and back surfaces 62 and 64 of the test plate 60.

A return flat 72 reflects the test beam 20 including both central rays 68 and 70 along a backward pathway 74 to the beamsplitter 14. Preferably, the reflective surfaces of the test plate 60 and the return flat 72 form a right angle for substantially retroreflecting the test beam 20 along the returning pathway 74 in an orientation that is substantially parallel to the forward pathway 44. A quarter waveplate 76 interrupts the test beam 20 along both the forward and backward pathways 44 and 74 to change the polarization of the test beam 20 for favoring reflection through the beamsplitter 14 on route to the video camera 52.

Figure 3:
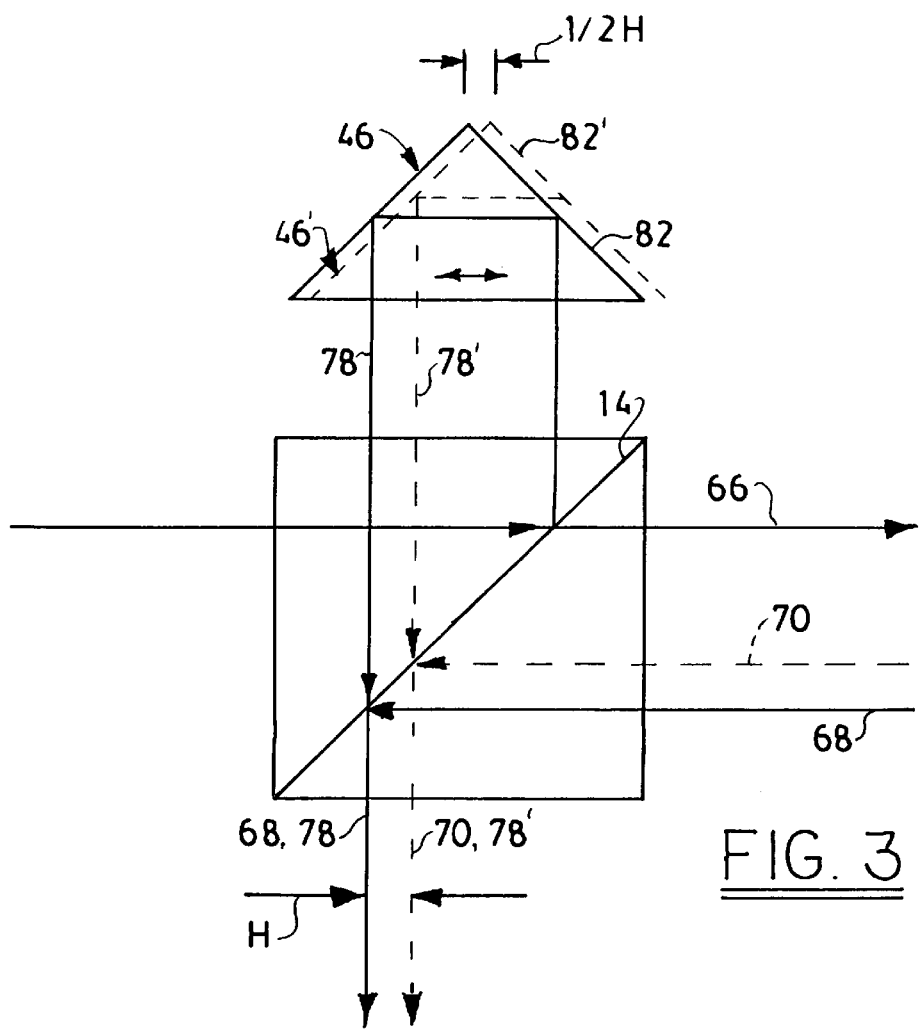
FIG. 3 is an enlarged partial view of the interferometer in the vicinity of a beamsplitter and a reference prism illustrating alignment options between the reference beam and two sheared portions of a test beam.

FIG. 3 relates the central rays 68 and 70 of the test beam to a central ray 78 of the returning reference beam 16 at the beamsplitter 14. Of the two central rays 68 and 70 of the test beam 20, only the central ray 68 reflected from the front surface 62 of the test plate 60 is shown in alignment with the central ray 78 of the reference beam 16. The other central ray 70 of the test beam 20 is laterally offset from the central ray 78 of the reference beam 16 by an amount that exceeds the spatial coherence limit of the beams 16 and 20. Thus, a high-contrast interference fringe pattern can be formed between the reference beam 16 and the portion of the test beam 20 that reflects from the front surface 62 of the test plate, but no effective fringes are formed between the reference beam and the relatively sheared portion of the test beam 20 that reflects from the back surface 64 of the test plate.

An anamorphic imaging system 80 overlays images of a reference surface 82 of the right-angle prism 46 and the front surface 62 of the test plate 60 onto a common image plane 83 of the camera 52 for arranging the interference pattern to represent topographical differences between the two surfaces 62 and 82. The reference surface 82 is imaged directly onto the common image plane 83, whereas an image of the front surface 62 formed by the beam expander 54 is relayed to the common image plane 84 from an intermediate image plane 84. Both the reference surface 82 and the intermediate image plane 84 are conjugate to the common image plane 83.

Figure 4:
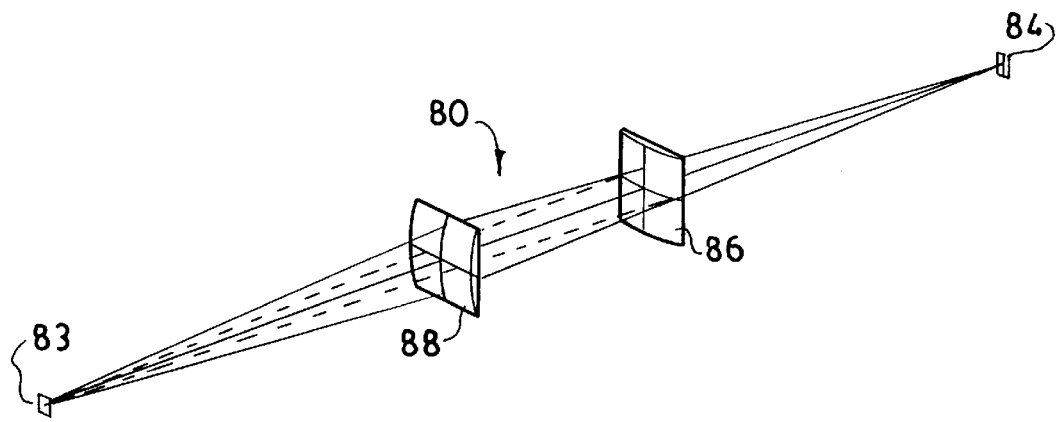
FIG. 4 is an enlarged partial view of the interferometer illustrating an anamorphic imaging system that compensates for grazing incidence distortion.

As best seen in the enlarged view of FIG. 4, the anamorphic imaging system 80 includes two cylindrical lenses 86 and 88 with curvatures oriented in different orthogonal directions to compensate for distortions caused by illuminating the test plate 60 at grazing incidence. Within the intermediate image plane 84, the relayed image of the test plate's front surface 62 is anamorphically distorted. However, differential magnifications of the two cylindrical lenses 86 and 88 restore the true aspect ratio of the front surface's image in the common image plane 83. This is accomplished by requiring image and object planes of both lenses 86 and 88 to coincide while allowing the ratio of their object and image distances to vary.

The back surface 64 of the test plate 60 can also be measured without reversing the orientation of the test plate 60 by translating the reference prism 46 traverse to the parallel directions of reference beam 16 propagation in the reference arm 18. The required movement as depicted in FIG. 3 shifts the central ray 78 of the reference beam 16 from alignment with the central ray 68 of the test beam 20 into alignment with the central ray 70 of the test beam. (Primes are added to the reference numerals of elements affected by the shift.) The two positions of alignment with the central rays 68 and 70 can be identified locally as positions of maximum fringe contrast. The lateral translation of the prism 46 has little effect on image conjugacy because the change is within the depth of focus of the anamorphic imaging system 80.

Figure 5:
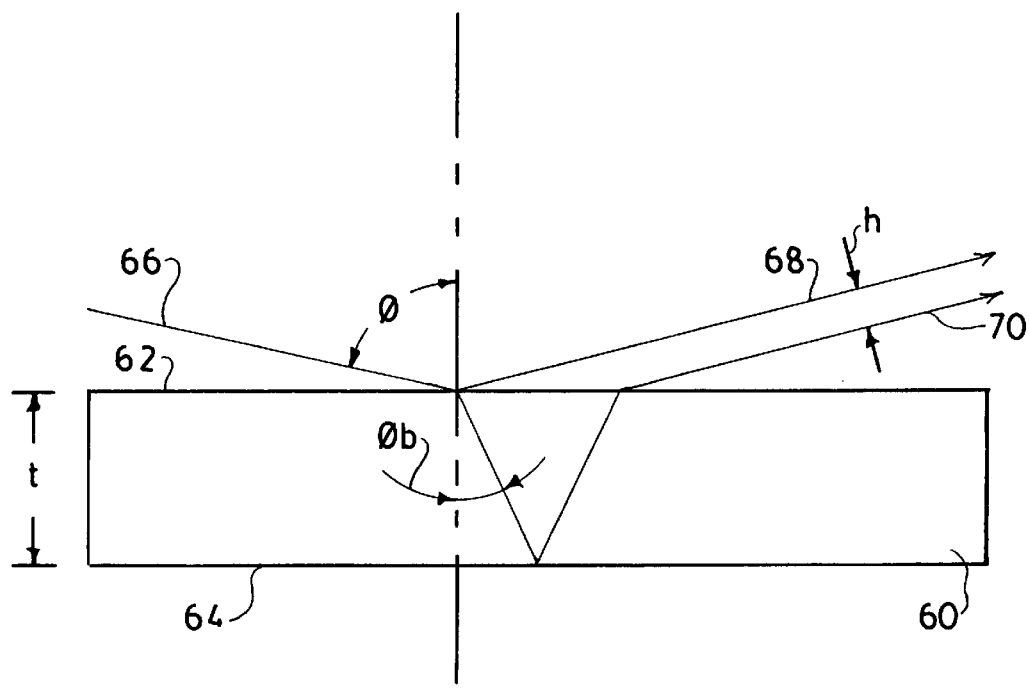
FIG. 5 is an enlarged diagram of the test plate showing various parameters associated with the lateral shearing of the test beam.

A measure of the amount of beam shift "H", which is two times the amount of prism translation required to compensate for the lateral shearing "h" of the test beam 20, can be used to calculate an overall thickness "t" of the test plate 60. Referring to FIG. 5, the following relations are evident:

$$t = \frac{h}{2 \cdot \cos\phi \cdot \tan\phi_b} \quad (1)$$

$$\phi_b = a\sin\left(\frac{\sin\phi}{n}\right) \quad (2)$$

where "$\phi$" is the angle of incidence with the front surface 62, "$\phi_b$" is the angle of incidence with the back surface 64, and "n" is the index of refraction of the test plate 60.

The lateral shear "h" is related to the required beam shift "H" (two times the reference prism shift) by a magnitude "m" of the beam expander 54 in the test arm 22 as follows:

$$h = m \bullet H \quad (3)$$

By substitution, the plate thickness "t" can be derived from the following combination of variables:

$$t = \frac{m \cdot H}{2 \cdot \cos\phi \cdot \tan\left(a\sin\frac{\sin\phi}{n}\right)} \quad (4)$$

Inverting the test plate 60 and re-measuring one of its surfaces 62 or 64 also provides enough information for measuring variations in refractive index (i.e., homogeneity variations) throughout the test plate 60.

The measurement of different test surfaces including those having different degrees of surface roughness can be optimized by adjusting the sensitivity "S" of the fringe pattern to topographical variation, which is a function of the grazing angle as follows:

$$S = \frac{\lambda}{2 \cdot \cos\phi} \quad (5)$$

where "$\lambda$" is the wavelength of the test beam.

A variety of other optical apparatus can be arranged to accomplish many of the individual or collective functions of the apparatus described in the preceding drawing figures. For example, other types of diffusers can be substituted for the rotating diffuser plate 34. Multiple light sources could also be arranged to produce the required degrees of temporal and spatial coherence. The beam expanders can incorporate either focusing or diverging lenses for expanding the beams, and the anamorphic optical elements can include other combinations of lenses to produce similar results.

The right angle prism 46, which includes the reference surface 82, also functions as a return flat for returning the reference beam along a parallel path. Separate structures could also be used for supporting the reference surface and the return flat. In addition to moving the prism 46 for realigning the reference beam 16 with either portion of the test beam 20, the test plate support 65 as well as other optical elements can be moved to change the optical alignment of the reference and test beams 16 and 20.

Figure 6:
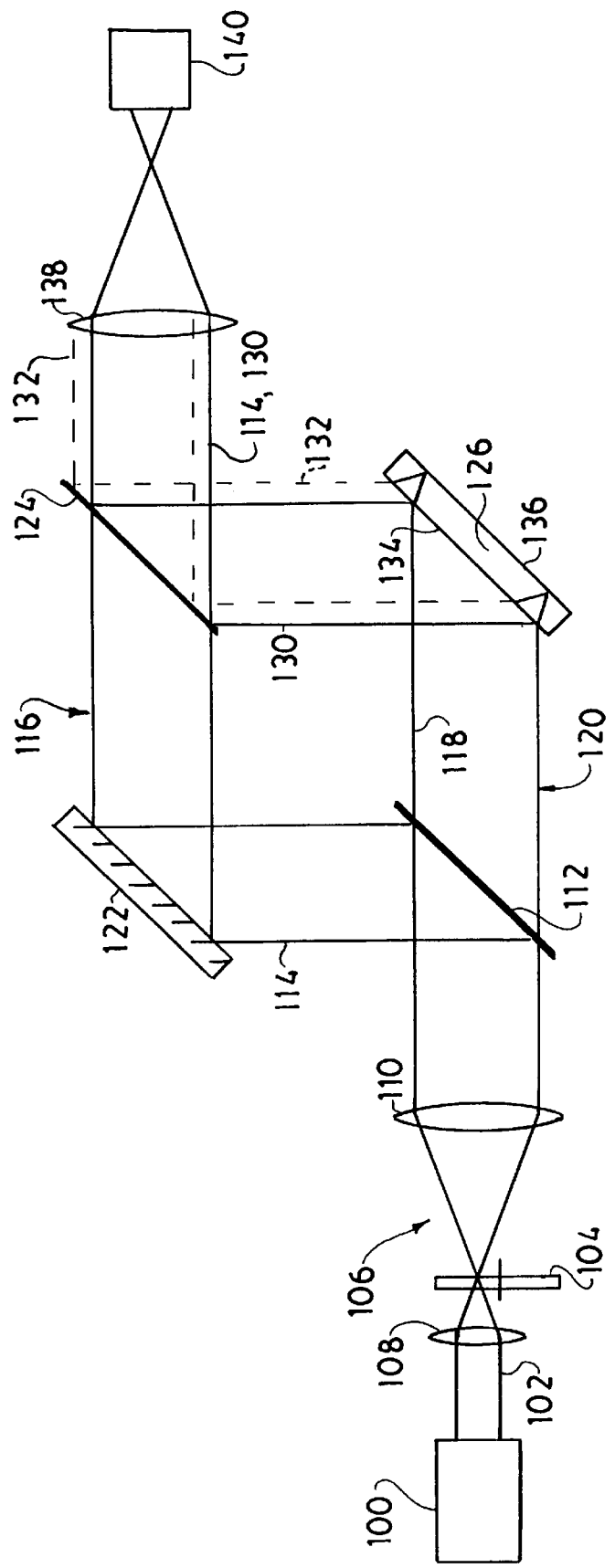
FIG. 6 is a diagram of a Mach-Zehnder interferometer also with an extended light source and a similar test plate oriented for measurement at grazing incidence.

The Mach-Zehnder interferometer of FIG. 6 illustrates the applicability of our invention to other interferometer types. A similar light source 100 is used for producing a primary beam 102. Another rotating diffuser plate 104 interrupts the primary beam within a beam expander 106 between a focusing lens 108 and a collimating lens 110, creating the equivalent of an extended light source.

A first beamsplitter 112 divides the primary beam 102 into a reference beam 114 propagating along a reference arm 116 and a test beam 118 propagating along a test arm 120. An adjustable reference mirror 122 reflects the reference beam toward a second beamsplitter 124. A test plate 126 shears the test beam 118 into two portions 130 and 132 and reflects the two relatively sheared portions 130 and 132 toward the second beamsplitter 124. The relatively sheared portion 130 reflects from a front surface 134 of the test plate 126, and the relatively sheared portion 132 reflects from a back surface 136 of the test plate 126.

The reference beam 114 transmits through the second beamsplitter 124 and a focusing optic 138 to a camera 140, and the two relatively sheared portions 130 and 132 of the test beam 118 are reflected by the second beamsplitter 124 on a parallel course through the focusing optic 138 to the camera 140. In the illustrated embodiment, only the relatively sheared portion 130 that is reflected from the front surface 134 of the test plate 126 is realigned with the reference beam 114. The other relatively sheared portion 132 is laterally offset by an amount that is beyond the spatial coherence of the beams 114 and 132, which spatial coherence is controlled by adjusting the size of the extended light source.

Accordingly, an interference pattern representing topographical variations in the front surface 134 of the test plate 126 is projected onto the camera 140 (or its image plane) without also projecting any similar interference patterns representing surface topography of the back surface 136 of the test plate 126. However, the back surface 136 of the test plate 126 can also be measured independently of the front surface 134 of the test plate 126 by adjusting the reference mirror 122 (or other optical element including the test plate 126) to align the relatively sheared portion 132 of the test beam 118 with the reference beam 114.

We claim:

1. A grazing incidence interferometer for measuring transparent test plates comprising:

an extended light source that is sized to regulate a degree of spatial coherence in a primary beam;

a beamsplitter that divides the primary beam into reference and test beams having limited degrees of spatial coherence;

a test plate support that mounts a test plate having a front surface and a back surface;

said support being arranged for orienting the test plate at a non-normal angle of incidence to the test beam so that a first portion of the test beam is reflected from the front surface of the test plate, a second portion of the test beam is reflected from the back surface of the test plate, and the first and second portions of the test beam are sheared with respect to each other;

said extended light source also being sized to limit spatial coherence of the test beam in relation to the relative shear between the first and second portions of the test beam for significantly reducing contrast of an interference fringe pattern between the front and back surfaces of the test plate;

an alignment mechanism that realigns only one of the first and second portions of the test beam with the reference beam for favoring the formation of an interference pattern between the reference surface and one of the front and back surfaces of the test plate over the formation of an interference pattern between the reference surface and the other of the front and back surfaces of the test plate; and said alignment mechanism providing for relatively moving the reference beam into a position of lateral alignment with the one test beam portion without also relatively moving the reference beam into a position of lateral alignment with the other of the test beam portions.

2. The interferometer of claim 1 further comprising a reference surface for reflecting the reference beam along a path that laterally realigns the reference beam with the one portion of the test beam without changing the angle of incidence at which the test plate is oriented with respect to the test beam.

3. The interferometer of claim 2 in which said alignment mechanism provides for moving one of said reference surface and said test plate for laterally realigning the reference beam with the one portion of the test beam without reducing the shear between the first and second portions of the test beam.

4. The interferometer of claim 1 further comprising a source of a temporally and spatially coherent light beam, and said extended light source being formed by a diffuser that is positioned for interrupting the temporally and spatially coherent light beam.

5. The interferometer of claim 4 further comprising a focusing optic that projects the primary beam as a spot of illumination on said diffuser for forming said extended light source, and said focusing optic is adjustable for sizing the extended light source.

6. A grazing incidence interferometer for measuring transparent test plates comprising:

an extended light source that is sized to regulate a degree of spatial coherence in a primary beam:

a beamsplitter that divides the primary beam into reference and test beams having limited degrees of spatial coherence:

a test plate support that mounts a test plate having a front surface and a back surface:

said support being arranged for orienting the test plate at grazing incidence to the test beam so that a first portion of the test beam is reflected from the front surface of the test plate, a second portion of the test beam is reflected from the back surface of the test plate, and the first and second portions of the test beam are sheared with respect to each other:

said extended light source also being sized to limit spatial coherence of the test beam in relation to the relative shear between the first and second portions of the test beam for significantly reducing contrast of an interference fringe pattern between the front and back surfaces of the test plate:

an alignment mechanism that realigns only one of the first and second portions of the test beam with the reference beam for favoring the formation of an interference pattern between the reference surface and one of the front and back surfaces of the test plate over the formation of an interference pattern between the reference surface and the other of the front and back surfaces of the test plate:

a reference surface for reflecting the reference beam along a path that realigns the reference beam with the one portion of the test beam:

said alignment mechanism providing for moving one of said reference surface and said test plate for realigning the reference beam with the one portion of the test beam: and, said reference beam being relatively movable from a first position at which the reference beam is aligned with the first portion of the test beam for measuring the front surface of the test plate to a second position at which the reference beam is aligned with the second portion of the test beam for measuring the back surface of the test plate.

7. A grazing incidence interferometer for measuring transparent test plates comprising:

an extended light source that is sized to regulate a degree of spatial coherence in a primary beam;

a beamsplitter that divides the primary beam into reference and test beams having limited degrees of spatial coherence:

a test plate support that mounts a test plate having a front surface and a back surface:

said support being arranged for orienting the test plate at grazing incidence to the test beam so that a first portion of the test beam is reflected from the front surface of the test plate, a second portion of the test beam is reflected from the back surface of the test plate, and the first and second portions of the test beam are sheared with respect to each other:

said extended light source also being sized to limit spatial coherence of the test beam in relation to the relative shear between the first and second portions of the test beam for significantly reducing contrast of an interference fringe pattern between the front and back surfaces of the test plate:

an alignment mechanism that realigns only one of the first and second portions of the test beam with the reference beam for favoring the formation of an interference pattern between the reference surface and one of the front and back surfaces of the test plate over the formation of an interference pattern between the reference surface and the other of the front and back surfaces of the test plate;

a reference arm that conveys the reference beam from said beamsplitter to a reference surface along a forward pathway and from the reference surface to the beamsplitter along a backward pathway that is offset from the forward pathway; and a test arm that conveys the test beam from said beamsplitter to the parallel surfaces of the test plate along a forward pathway and from the parallel surfaces of the test plate to the beamsplitter along a backward pathway that is offset from the forward pathway.

8. The interferometer of claim 6 further comprising a beam expander in said test arm having a first aperture portion along the forward pathway sized for illuminating the parallel surfaces of the test plate and a second aperture portion along the backward pathway sized for conveying images of the parallel surfaces of the test plate toward said beamsplitter.

9. The interferometer of claim 7 in which said test arm includes a reflector for returning the test beam portions along the backward pathway of the test arm.

10. A grazing incidence interferometer for measuring transparent test plates comprising:

an extended light source that is sized to regulate a degree of spatial coherence in a primary beam:

a beamsplitter that divides the primary beam into reference and test beams having limited degrees of spatial coherence:

a test plate support that mounts a test plate having a front surface and a back surface:

said support being arranged for orienting the test plate at grazing incidence to the test beam so that a first portion of the test beam is reflected from the front surface of the test plate, a second portion of the test beam is reflected from the back surface of the test plate, and the first and second portions of the test beam are sheared with respect to each other:

said extended light source also being sized to limit spatial coherence of the test beam in relation to the relative shear between the first and second portions of the test beam for significantly reducing contrast of an interference fringe pattern between the front and back surfaces of the test plate:

an alignment mechanism that realigns only one of the first and second portions of the test beam with the reference beam for favoring the formation of an interference pattern between the reference surface and one of the front and back surfaces of the test plate over the formation of an interference pattern between the reference surface and the other of the front and back surfaces of the test plate: and a viewing system that includes anamorphic optical elements to compensate for image distortion associated with the orientation of the test plate for illuminating the front and back surfaces of the test plate at grazing incidence.

11. The interferometer of claim 10 further comprising a viewing system that includes anamorphic optical elements to compensate for image distortion associated with the orientation.

12. An optical system for measuring test parts having parallel surfaces that reflect light at grazing incidence comprising:

an extended light source that produces a primary beam of light having a limited spatial coherence;

a beamsplitter that divides the primary beam into a test beam and a reference beam;

a test part support that orients the parallel surfaces of a test part at grazing incidence to the test beam so that a first portion of the test beam reflects from a first of the parallel surfaces of the test part, a second portion of the test beam reflects from a second of the parallel surfaces of the test part, and the first and second portions of the test beam are laterally sheared with respect to each other;

a reference surface support that orients a reference surface to the reference beam for realigning the reference beam with the first test beam portion;

a viewing system that produces an effective interference fringe pattern between the reference surface and the first surface of that test part;

said extended light source being sized to preclude the simultaneous formation of similarly effective interference patterns between the first and second surfaces of the test part: and said test part support and said reference surface support being relatively movable for reducing lateral shear between the reference beam and the first portion of the test beam without reducing lateral shear between the reference beam and the second portion of the test beam.

13. The system of claim 12 further comprising a diffuser that interrupts the beam of light produced by the light source for limiting the spatial coherence of the beam.

14. The system of claim 13 further comprising a non-collimating optic that projects the primary beam as a spot of illumination on said diffuser for forming said extended light source, and said non-collimating optic is adjustable for sizing the extended light source.

15. An optical system for measuring test parts having parallel surfaces that reflect light at grazing incidence comprising:

an extended light source that produces a primary beam of light having a limited spatial coherence:

a beamsplitter that divides the primary beam into a test beam and a reference beam:

a test part support that orients the parallel surfaces of a test part at grazing incidence to the test beam so that a first portion of the test beam reflects from a first of the parallel surfaces of the test part, a second portion of the test beam reflects from a second of the parallel surfaces of the test part, and the first and second portions of the test beam are laterally sheared with respect to each other;

a reference surface support that orients a reference surface to the reference beam for realigning the reference beam with the first test beam portion;

a viewing system that produces an effective interference fringe pattern between the reference surface and the first surface of that test part;

said extended light source being sized to preclude the simultaneous formation of similarly effective interference patterns between the first and second surfaces of the test part; and said viewing system including anamorphic optical elements to compensate for image distortion associated with the orientation of the test part for illuminating the first surface of the test part at grazing incidence.

16. The system of claim 15 in which said anamorphic optical elements produce different magnifications of an image of the first surface of the test part in orthogonal directions.

17. An optical system for measuring test parts having parallel surfaces that reflect light at grazing incidence comprising:

an extended light source that produces a primary beam of light having a limited spatial coherence;

a beamsplitter that divides the primary beam into a test beam and a reference beam;

a test part support that orients the parallel surfaces of a test part at grazing incidence to the test beam so that a first portion of the test beam reflects from a first of the parallel surfaces of the test part, a second portion of the test beam reflects from a second of the parallel surfaces of the test part, and the first and second portions of the test beam are laterally sheared with respect to each other;

a reference surface support that orients a reference surface to the reference beam for realigning the reference beam with the first test beam portion:

a viewing system that produces an effective interference fringe pattern between the reference surface and the first surface of that test part;

said extended light source being sized to preclude the simultaneous formation of similarly effective interference patterns between the first and second surfaces of the test part; and the reference beam being relatively movable from a first position at which the reference beam is aligned with the first portion of the test beam for measuring the first surface of the test plate to a second position at which the reference beam is aligned with the second portion of the test beam for measuring the second surface of the test plate.

18. The system of claim 17 in which one of said reference surface and test part supports are movable for relatively moving the reference beam between the first and second positions.

19. A method of isolating an interference fringe pattern between a reference surface and a first of two parallel surfaces of a test part from interference fringe patterns between the reference surface and a second parallel surface of the test part and between the first and second parallel surfaces of the test part comprising the steps of:

dividing a primary beam into reference and test beams;

orienting the test part at grazing incidence to the test beam so that a first portion of the test beam is reflected from the first surface of the test part, a second portion of the test beam is reflected from the second surface of the test part, and the two test beam portions are laterally sheared with respect to each other;

limiting the spatial coherence of the test beam in relation to the relative shear between the first and second portions of the test beam for significantly reducing contrast of an interference fringe pattern between the first and second surfaces of the test part;

realigning the reference beam with the first portion of the test beam for favoring the formation of an interference pattern between the reference surface and the first surface of the test part over the formation of an interference pattern between the reference surface and the second surface of the test part; and said step of realigning including relatively moving the reference beam with respect to both the first and second portions of the test beam to a first position that produces a maximum fringe contrast in the interference pattern between the reference beam and the first test beam portion which is different from a second position at which the reference beam is relatively movable for producing a maximum fringe contrast in the interference pattern between the reference beam and the second test beam portion.

20. The method of claim 19 comprising the additional step of reflecting the reference beam from a reference surface into realignment with the first portion of the test beam.

21. The method of claim 20 in which the test part is mounted on a test part support and the reference surface is mounted on a reference surface support, and said step of realigning includes moving one of the test part and reference surface supports.

22. The method of claim 19 in which said step of limiting includes limiting the spatial coherence of the test beam so that any pattern of interference between the first and second surfaces of the test part does not significantly affect a measurement of the favored interference pattern between the reference surface and the first surface of the test part.

23. The method of claim 19 in which said step of realigning does not affect the amount of lateral shear between the first and second portions of the test beam.

24. The method of claim 19 including the further step of relaying an image of the test part's first surface that is anamorphically distorted as a result of the orientation of the test part for illumination at grazing incidence.

25. A method of isolating an interference fringe pattern between a reference surface and a first of two parallel surfaces of a test part from interference fringe patterns between the reference surface and a second parallel surface of the test part and between the first and second parallel surfaces of the test part comprising the steps of:

dividing a primary beam into reference and test beams:

orienting the test part at grazing incidence to the test beam so that a first portion of the test beam is reflected from the first surface of the test part, a second portion of the test beam is reflected from the second surface of the test part, and the two test beam portions are laterally sheared with respect to each other;

limiting the spatial coherence of the test beam in relation to the relative shear between the first and second portions of the test beam for significantly reducing contrast of an interference fringe pattern between the first and second surfaces of the test part;

realigning the reference beam with the first portion of the test beam for favoring the formation of an interference pattern between the reference surface and the first surface of the test part over the formation of an interference pattern between the reference surface and the second surface of the test part; and relatively moving the reference beam from a first position at which the reference beam is aligned with the first portion of the test beam for measuring the first surface of the test part to a second position at which the reference beam is aligned with the second portion of the test beam for measuring the second surface of the test part.

26. The method of claim 25 including the further steps of measuring the amount of relative movement between the reference beam and the first and second portions of the test beam and using this measurement of relative movement to calculate a thickness between the first and second surfaces of the test part.

27. The method of claim 25 including the further step of reorienting the test part and repeating said step of realigning for measuring one of the first and second surfaces of the test part for a second time.

28. The method of claim 27 in which the measurements of both the first and second surfaces of the test part in one orientation of the test part are compared with the additional measurement of one of the first and second surfaces of the test part in a different orientation for measuring homogeneity of a material supporting the first and second surfaces of the test part.

29. A method of isolating an interference fringe pattern between a reference surface and a first of two parallel surfaces of a test part from interference fringe patterns between the reference surface and a second parallel surface of the test part and between the first and second parallel surfaces of the test part comprising the steps of:

dividing a primary beam into reference and test beams:

orienting the test part at grazing incidence to the test beam so that a first portion of the test beam is reflected from the first surface of the test part, a second portion of the test beam is reflected from the second surface of the test part, and the two test beam portions are laterally sheared with respect to each other;

limiting the spatial coherence of the test beam in relation to the relative shear between the first and second portions of the test beam for significantly reducing contrast of an interference fringe pattern between the first and second surfaces of the test part;

realigning the reference beam with the first portion of the test beam for favoring the formation of an interference pattern between the reference surface and the first surface of the test part over the formation of an interference pattern between the reference surface and the second surface of the test part; and using anamorphic optics to restore the image of the test part's first surface to its true aspect ratio.

30. The method of claim 29 including the further step of using optics that exhibit different object/image distance ratios in orthogonal directions for restoring the true aspect ratio of the image of the test part's first surface that is relayed to the image plane.

* * * * *